(12) United States Patent
Uchida et al.

(10) Patent No.: US 9,644,739 B2
(45) Date of Patent: May 9, 2017

(54) PACKING AND SEAL STRUCTURE OF BATTERY MODULE

(71) Applicants: OHTSUKA POLY-TECH CO., LTD., Hiki-gun, Saitama (JP); HONDA MOTOR CO., LTD., Tokyo (JP)

(72) Inventors: Yoshitaka Uchida, Saitama (JP); Tetsuya Sugizaki, Saitama (JP); Tomohiro Higaki, Saitama (JP)

(73) Assignees: OHTSUKA POLY-TECH CO., LTD., Hiki-Gun, Saitama (JP); HONDA MOTOR CO., LTD., Tokyo (JP)

(*) Notice: Subject to any disclaimer, the term of this patent is extended or adjusted under 35 U.S.C. 154(b) by 198 days.

(21) Appl. No.: 14/551,486

(22) Filed: Nov. 24, 2014

(65) Prior Publication Data

US 2015/0147639 A1 May 28, 2015

(30) Foreign Application Priority Data

Nov. 25, 2013 (JP) ................................. 2013-242990

(51) Int. Cl.
| | |
|---|---|
| F16J 15/06 | (2006.01) |
| F16J 15/02 | (2006.01) |
| H01M 2/10 | (2006.01) |
| H01M 10/6563 | (2014.01) |
| H01M 10/6556 | (2014.01) |

(52) U.S. Cl.
CPC ........... *F16J 15/022* (2013.01); *F16J 15/025* (2013.01); *H01M 2/1077* (2013.01); *H01M 2/1094* (2013.01); *H01M 10/6556* (2015.04); *H01M 10/6563* (2015.04)

(58) Field of Classification Search
None
See application file for complete search history.

(56) References Cited

U.S. PATENT DOCUMENTS

| | | | |
|---|---|---|---|
| 2001/0010417 A1* | 8/2001 | Goto | F16J 15/025 |
| | | | 277/637 |
| 2005/0120633 A1* | 6/2005 | Takase | F16J 15/025 |
| | | | 49/441 |

(Continued)

FOREIGN PATENT DOCUMENTS

| | | |
|---|---|---|
| CN | 103311465 A | 9/2013 |
| JP | 2002-02002-022015 A | 1/2002 |

(Continued)

OTHER PUBLICATIONS

Japanese Office Action Notification of Reasons for Refusal application No. 2013-242990 dated Mar. 8, 2016.

(Continued)

*Primary Examiner* — Scott J Chmielecki
(74) *Attorney, Agent, or Firm* — Squire Patton Boggs (US) LLP (57) ABSTRACT

A packing includes a base part that is attached to a duct, and a seal lip part that extends from the base part toward a battery module to press against the battery module. A first bend portion is provided midway in the seal lip part. A second bend portion is provided in a continuous portion between the base part and the seal lip part. The first bend portion and the second bend portion are bent in a direction opposite to each other.

8 Claims, 9 Drawing Sheets

(56) References Cited

U.S. PATENT DOCUMENTS

| | | | | |
|---|---|---|---|---|
| 2008/0303224 A1* | 12/2008 | Knapp | ............... | F16L 25/0054 |
| | | | | 277/627 |
| 2009/0311607 A1* | 12/2009 | Han | ...................... | H01M 2/04 |
| | | | | 429/246 |
| 2011/0031705 A1* | 2/2011 | Peddle | .................. | B65D 53/02 |
| | | | | 277/650 |
| 2011/0221143 A1* | 9/2011 | Toth | ...................... | F16J 15/025 |
| | | | | 277/549 |
| 2013/0075980 A1* | 3/2013 | Yamamoto | ............ | F16J 15/025 |
| | | | | 277/591 |
| 2013/0127118 A1* | 5/2013 | Sedlar | ................. | F16J 15/3268 |
| | | | | 277/309 |
| 2013/0234402 A1* | 9/2013 | Fietz | ..................... | F16J 15/002 |
| | | | | 277/549 |
| 2013/0236754 A1 | 9/2013 | Lim | | |

FOREIGN PATENT DOCUMENTS

| | | |
|---|---|---|
| JP | 2004-116101 A | 4/2004 |
| JP | 2010-531535 A | 9/2010 |
| JP | 2010-223521 A | 10/2010 |
| JP | 2012-141040 A | 7/2012 |
| WO | 2009/002096 A1 | 12/2008 |

OTHER PUBLICATIONS

Chinese Office Action application No. 201410674283.8 issued Jun. 22, 2016.

\* cited by examiner

PACKING AND SEAL STRUCTURE OF BATTERY MODULE

CROSS-REFERENCE TO RELATED APPLICATION

This application is based upon and claims the benefit of priority to the Japanese Patent Application No. 2013-242990, filed on Nov. 25, 2013, the entire contents of which are incorporated herein by reference.

BACKGROUND OF THE INVENTION

1. Field of the Invention

The present invention relates to a packing and a seal structure of a battery module using the packing.

2. Description of the Related Art

Conventionally, a packing of every sort and kind that seals a space between two members has been developed. This kind of packing is described, for example, in Patent Document 1: Japanese Patent Application Publication No. 2004-116101. The packing described in Patent Document 1 is provided with a base part that is extended along a direction intersecting with a sealing direction, a first seal lip part that is bent from one end of the base part to extend toward one member, and a second seal lip part that is bent from the other end of the base part in a direction opposite to the bend direction of the first seal lip part to extend toward the other member.

However, with a packing according to the invention described in Patent Document 1, when arranging the packing onto the one member and assembling the other member via the packing together with the one member, the first seal lip part is bent toward the other member with the base part side as the center, and the second seal lip part is bent toward the one member with the base part side as the center. That is, each of the first seal lip part and the second seal lip part is bent at only one point, respectively. Accordingly, extension ends of the first seal lip part and the second seal lip part are displaced in the direction intersecting with the sealing direction, respectively, and thus a desired sealing performance may not be provided due to a positional displacement of the extension ends.

SUMMARY OF THE INVENTION

The present invention has been made in view of the above problem and an object thereof is to provide a packing and a seal structure of a battery module using the packing, which can suppress a positional displacement of an extension end of a seal lip part.

In order to solve the above problems, the present invention provides, as one aspect thereof, a packing that seals a space between two members, including: a base part that is attached to one member of the two members; and a seal lip part that extends from the base part toward the other member of the two members to press against the other member, wherein a first bend portion is provided midway in the seal lip part, a second bend portion is provided in a continuous portion between the base part and the seal lip part, and the first bend portion and the second bend portion are bent in opposite directions to each other.

According to the present invention, since the first bend portion is provided midway in the seal lip part, the second bend portion is provided in the continuous portion between the base part and the seal lip part, and the first bend portion and the second bend portion are bent in opposite directions to each other, the seal lip part is bent at two points when assembling the two members together. More specifically, a portion extending from the first bend portion up to an extension end of the seal lip part is bent to fall over toward the one member with the first bend portion as the center, and a portion extending from the first bend portion up to the continuous portion is bent to fall over in a direction opposite to the bend direction of the first bend portion toward the one member with the second bend portion as the center. This allows a displacement of the extension end in the direction intersecting with the sealing direction by a bending action of the first bend portion to be suppressed (counterbalanced) by a bending action of the second bend portion. Consequently, a positional displacement of the extension end can be suppressed to provide a desired sealing performance.

In addition, it is preferable that the base part is configured to have a base part side seal portion that presses against the one member, at a position which is aligned in a sealing direction with an extension end of the seal lip part.

According to this configuration, since the base part has the base part side seal portion that presses against the one member, at a position which is aligned in the sealing direction with the extension end of the seal lip part, it is possible to reliably seal a space between the base part and the one member, and a space between the seal lip part and the other member, respectively. Moreover, surface pressures acting on the extension end and the base part side seal portion can be made uniform.

Further, it is preferable that the extension end of the seal lip part is configured to have a curved surface shape, and the base part side seal portion is configured to be formed to have a curvature equal to or nearly equal to a curvature of the extension end of the seal lip part.

According to this configuration, since the extension end of the seal lip part has the curved surface shape, and the base part side seal portion is formed to have the curvature equal to or nearly equal to that of the extension end of the seal lip part, contact areas between the packing and the one and the other members can be reduced, as compared to a case where the extension end and the base part side seal portion have a planar shape. Therefore, dispersion of the surface pressure can be suppressed to improve the sealing performance.

Furthermore, it is preferable that a portion extending from the first bend portion up to an extension end of the seal lip part is configured to be formed with a curve to have a middle portion thereof project toward the one member side.

According to this configuration, since the portion extending from the first bend portion up to the extension end of the seal lip part is formed with the curve to have the middle portion thereof project toward the one member side, the extension end of the seal lip part can be reliably brought into contact with the other member.

Moreover, a contact area between the packing and the other member can be reduced, as compared to a case where the portion extending from the first bend portion up to the extension end of the seal lip part has a linear shape. Therefore, dispersion of the surface pressure can be suppressed to improve the sealing performance.

Moreover, it is preferable that the seal lip part is configured to have a lip side seal portion that is provided between the first bend portion and an extension end of the seal lip part to press against the other member.

According to this configuration, since the seal lip part has the lip side seal portion that is provided between the first bend portion and the extension end to press against the other member, the sealing can be performed at two locations of the extension end and the lip side seal portion and thus the sealing performance between the packing and the other member can be improved.

Moreover, it is preferable that the base part is configured to have an engaging portion that is engageable with an engaged portion provided on the one member.

According to this configuration, since the base part has the engaging portion that is engageable with the engaged portion provided on the one member, the packing can be prevented from coming off from the one member and positioning of the packing can be facilitated.

Moreover, it is preferable that the base part is configured to have an extended portion that is extended along a direction intersecting with a sealing direction, and a stopper portion that is extended from the continuous portion toward an opposite direction of the extended portion.

According to this configuration, since the base part has the extended portion that is extended along the direction intersecting with the sealing direction, and the stopper portion that is extended from the continuous portion toward the opposite direction of the extended portion, a position of the center of gravity of the base part is stabilized to allow the packing to be stably arranged on the one member.

Moreover, in order to solve the above problems, the present invention provides, as another aspect thereof, a seal structure of a battery module, including: a battery module having an opening on at least one of an upside face and a downside face thereof; a duct that is attached to at least one of the upside face and the downside face of the battery module and supplies fluid through the opening; a packing that seals a space between the battery module and the duct; and a battery frame that is fastened and fixed to an orthogonal face of the battery module, which is perpendicular to the upside face and the downside face, wherein the packing includes: a base part that is attached to one of the battery module and the duct; and a seal lip part that extends from the base part toward the other of the battery module and the duct to press against the other, wherein a first bend portion is provided midway in the seal lip part, a second bend portion is provided in a continuous portion between the base part and the seal lip part, and the first bend portion and the second bend portion are bent in opposite directions to each other, and wherein a sealing direction of the battery module and the duct and a fastening direction of the battery module and the battery frame are perpendicular to each other.

According to the present invention, since the first bend portion is provided midway in the seal lip part, the second bend portion is provided in the continuous portion between the base part and the seal lip part, and the first bend portion and the second bend portion are bent in opposite directions to each other, the seal lip part is bent at two points when assembling the two members together. More specifically, a portion extending from the first bend portion up to an extension end of the seal lip part is bent to fall over toward one of the battery module and the duct with the first bend portion as the center, and a portion extending from the first bend portion up to the continuous portion is bent to fall over in a direction opposite to the bend direction of the first bend portion toward one of the battery module and the duct with the second bend portion as the center. This allows a displacement of the extension end in the direction intersecting with the sealing direction by a bending action of the first bend portion to be suppressed (counterbalanced) by a bending action of the second bend portion. Consequently, a positional displacement of the extension end can be suppressed to provide a desired sealing performance.

Particularly, according to the present invention, even in a case where a sealing direction of the battery module and the duct and a fastening direction of the battery module and the battery frame are perpendicular to each other and a sealing performance cannot be secured using a fastening power, the packing which can suppress a positional displacement of the extension end can be used to sufficiently secure the desired sealing performance.

The present invention can provide a packing and a seal structure of a battery module using the packing, which can suppress a positional displacement of an extension end of a seal lip part.

BRIEF DESCRIPTION OF THE DRAWINGS

FIGS. 7A and 7B are cross-sectional views showing a packing according to a first modification of the embodiment, in which

EMBODIMENT OF THE INVENTION

Hereinafter, an embodiment of the present invention will be described in detail with reference to the drawings when necessary. Note that "front-back", "up-down", and "right-left" indicated by arrow marks in each figure represent a front-back direction of a vehicle, an up-down direction of the vehicle, and a right-left direction (width direction of the vehicle) viewed from a driver's seat, respectively.

In the present embodiment, a description will be given of a case where a packing according to the present invention is applied to a seal structure of a battery pack (battery module) and a duct.

Prior to a description of a packing 1, a description will be given of configurations of a battery pack 2 and a duct 3 which are the target to be sealed. The battery pack 2 and the duct 3 are mounted, for example, on a vehicle such as a hybrid vehicle or an electric vehicle, and are arranged under a floor (not shown).

<Battery Pack>

Figure 1:
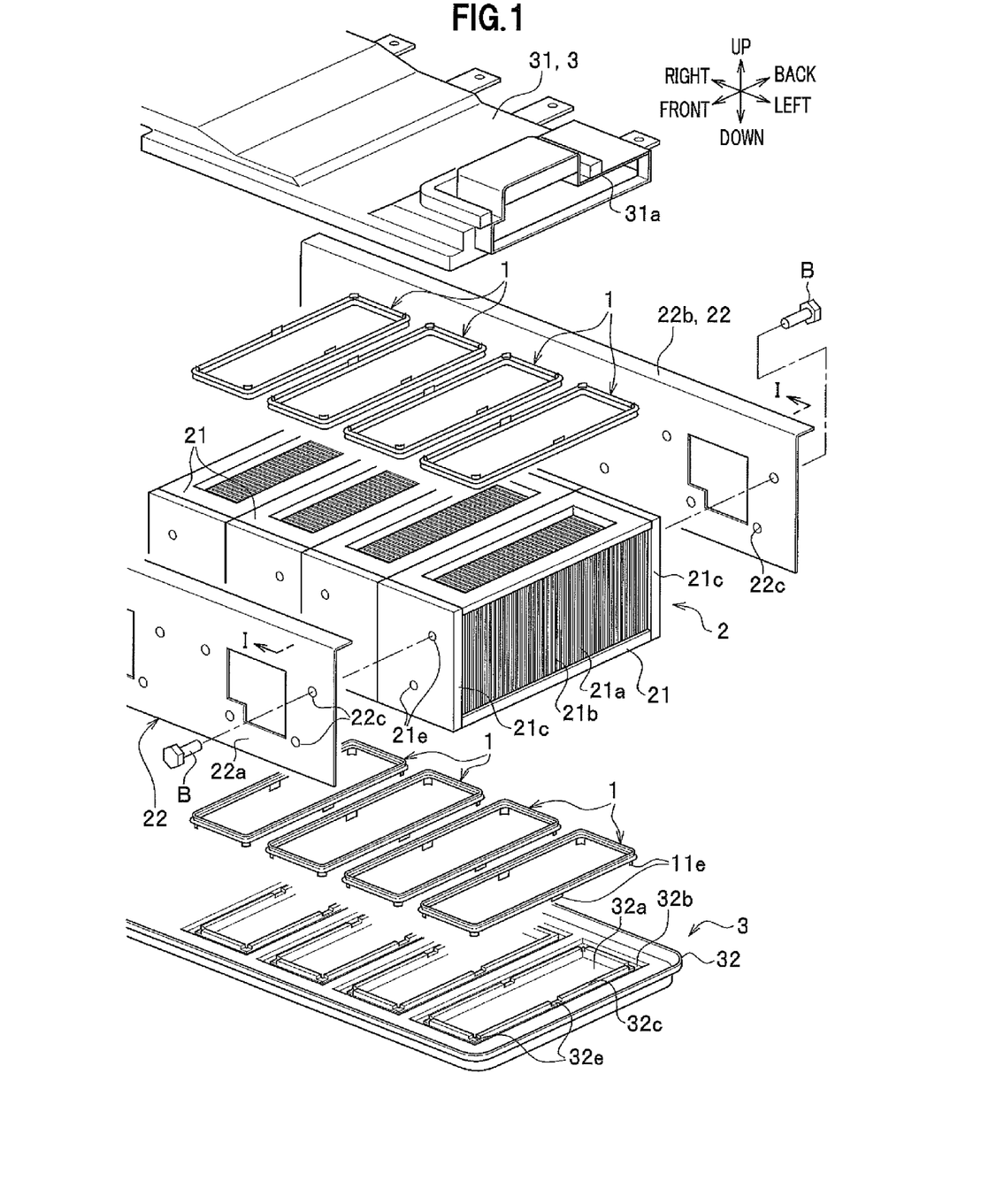
FIG. 1 is an exploded perspective view showing a seal structure of a battery module to which a packing according to an embodiment of the present invention is applied.

As shown in FIG. 1, the battery pack 2 is provided with a plurality of battery modules 21 arranged along the right-left direction, and battery frames 22 attached to both front and back faces of the battery module 21. The battery module 21 in the present embodiment constitutes "the other member" in the appended claims.

The battery module 21 is primarily constituted by a plurality of battery cells 21a and a plurality of holders 21b, each battery cell 21a and each holder 21b being alternately arranged along the front-back direction, and a pair of end plates 21c that sandwiches the battery cells 21a and the holders 21b from both front and back sides thereof for integration. In FIG. 1, a cover portion is omitted that blocks a left side face of the battery module 21.

Figure 2:
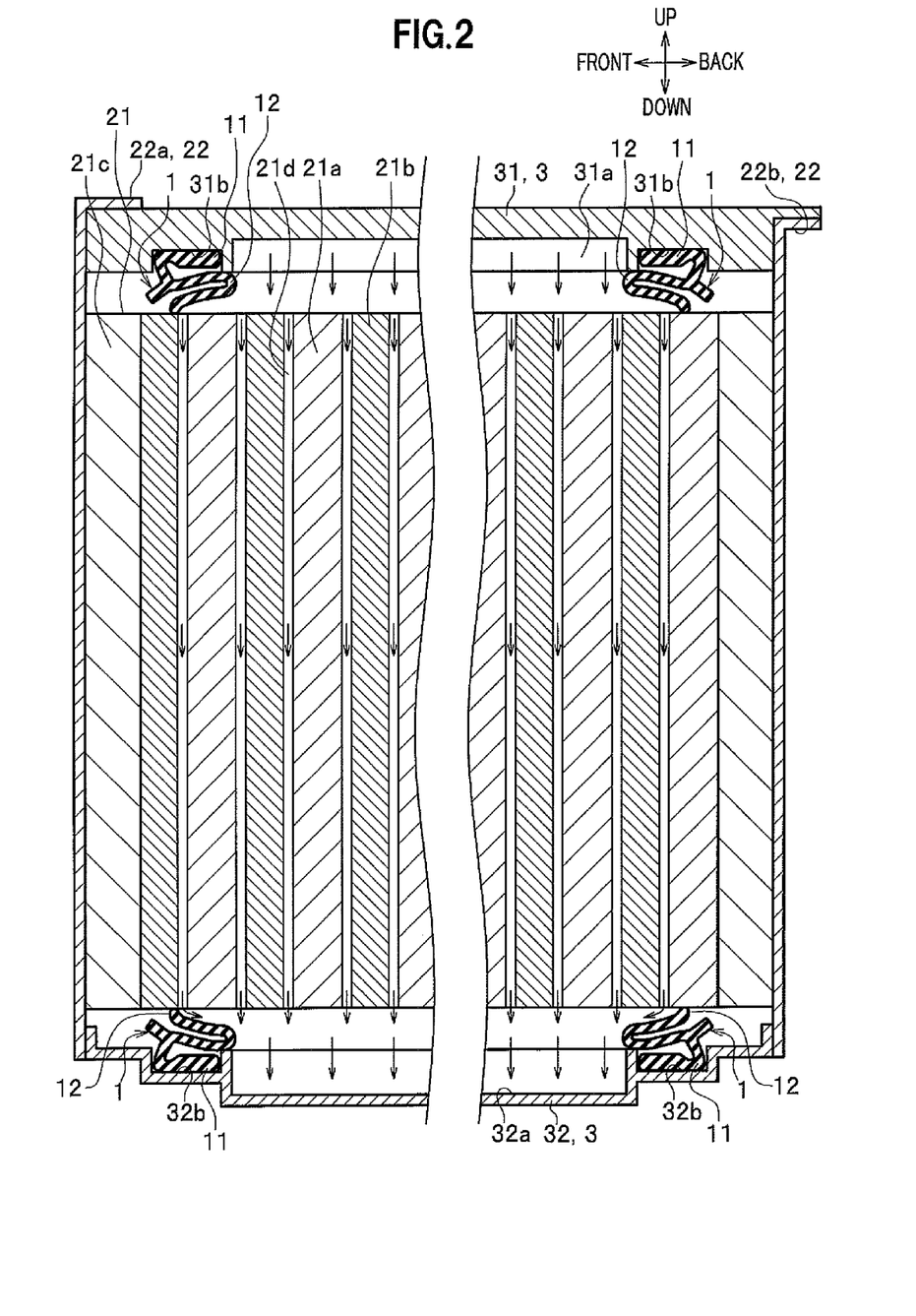
FIG. 2 is a cross-sectional view taken along the line I-I in FIG. 1, schematically showing a state in which the packing, a battery pack and a duct are assembled together.

As shown in FIG. 2, formed between the battery cell 21a and the holder 21b is a gap 21d that allows an upper duct 31 and a lower duct 32 to communicate with each other. A cooling gas (fluid) flows through the gap 21d for cooling the battery cells 21a. As indicated by arrow marks in FIG. 2, the cooling gas flows through an opening on the upside of the gap 21d downward and then is discharged from an opening on the downside of the gap 21d. Note that in the present embodiment, although the cooling gas flows from the upside face of the battery module 21 toward the downside face thereof, a configuration may be adopted in which the cooling gas flows from any one of the upside face and the downside face of the battery module 21 toward the side face thereof. As shown in FIG. 1, the end plate 21c is a rectangular and plate-like member made of metal. A plurality of bolt-insertion holes 21e are formed in the end plate 21c.

The battery frame 22 is constituted by a front frame 22a and a back frame 22b arranged on the front side and the back side of the battery module 21, respectively. Each of the front frame 22a and the back frame 22b is a nearly flat plate-like member made of metal which has a flange portion at its upper end. A plurality of bolt-insertion holes 22c are formed in the front frame 22a and the back frame 22b, penetrating therethrough in the front-back direction. Bolts B are inserted through the bolt-insertion holes 22c of the front frame 22a and the back frame 22b and the bolt-insertion holes 21e of the pair of end plates 21c, respectively, to fasten and fix the battery frame 22 to the battery module 21 (in FIG. 1, only one bolt B is shown on the front side and the back side, respectively). In the present embodiment, a fastening direction of the battery module 21 and the battery frame 22 coincides with the front-back direction.

<Duct>

The duct 3 is provided with the upper duct 31 and the lower duct 32 arranged on the upside and the downside of the battery module 21. The upper duct 31 and the lower duct 32 in the present embodiment constitute "one member" in the appended claims.

The upper duct 31 is a duct for supplying a cooling gas (e.g., air in the vehicle interior) through the gap 21d. The upper duct 31 is a nearly plate-like member extending in the right-left direction and covers the battery module 21 from up above. Formed at both right and left end portions of the upper duct 31, respectively, is an intake 31a for taking in air from the vehicle interior (in FIG. 1, only the intake 31a on the left side is shown). Although illustration is omitted, both the front and back end portions of the upper duct 31 are fixed to the battery frame 22 with bolts or claw parts.

The lower duct 32 is a duct for guiding the cooling gas discharged from the gap 21d to a fan (not shown). The lower duct 32 is a nearly plate-like member extending in the right-left direction and covers the battery module 21 from down below. Although illustration is omitted, front-back both end portions of the lower duct 32 are fixed to the battery frame 22 with bolts or claw parts.

Formed on the upside face of the lower duct 32 are a plurality of discharge grooves 32a each being of a nearly rectangular shape in planar view, and a plurality of housing grooves 32b each surrounding the circumference of the discharge groove 32a and being of a quadrangular annular shape in planar view, along the right-left direction. An engaged portion 32e is provided on an inner wall 32c that forms the housing groove 32b. The engaged portion 32e is formed by cutting off a portion of the inner wall 32c downward by a predetermined length to constitute a step portion which is lower than the remaining portion of the inner wall 32c. The engaged portions 32e are provided at four corners of the inner wall 32c and middle portions in longitudinal directions thereof, respectively. As shown in FIG. 2, the cooling gas discharged from the gap 21d flows into the discharge groove 32a. Housed in the housing groove 32b is a base part 11 of the packing 1. Also, housing grooves 31b are formed on the downside face of the upper duct 31.

Note that in the present embodiment, although the housing grooves 31b, 32b are formed in the duct 3, such housing grooves may be formed in the battery module 21. For example, a configuration may be adopted in which the packing 1 on the downside is housed in the housing groove 32b of the lower duct 32 and the packing 1 on the upside is housed in a housing groove on the upside face of the battery module 21.

Next, the packing 1 according to the present embodiment will be described with reference to FIGS. 1 to 5. In the description below, a direction in which the battery module 21 and the duct 3 come close to or separate from each other is referred to as a "sealing direction" in some cases. Moreover, an inner side surrounded by the packing 1 of an annular shape is simply referred to as an "inside" and an outer side not surrounded by the packing 1 is simply referred to as an "outside" in some cases.

<Packing>

As shown in FIG. 1, the packing 1 is a quadrangular annular member that seals a space between the battery module 21 and the upper duct 31, and a space between the battery module 21 and the lower duct 32. The packing 1 is formed of, for example, rubber, resin or the like. In the present embodiment, the sealing direction of the battery module 21 and the duct 3 coincides with the up-down direction, and is perpendicular to the fastening direction (front-back direction) of the battery module 21 and the battery frame 22.

As shown in FIG. 2, the packing 1 is provided with the base part 11 that is attached to the upper duct 31 or the lower duct 32, and a seal lip part 12 that presses against the battery module 21. Note that since the packing 1 on the upside and the packing 1 on the downside are arranged symmetrically up and down, the packing 1 on the downside will be described in detail and a description of the packing 1 on the upside will be omitted.

Figure 3:
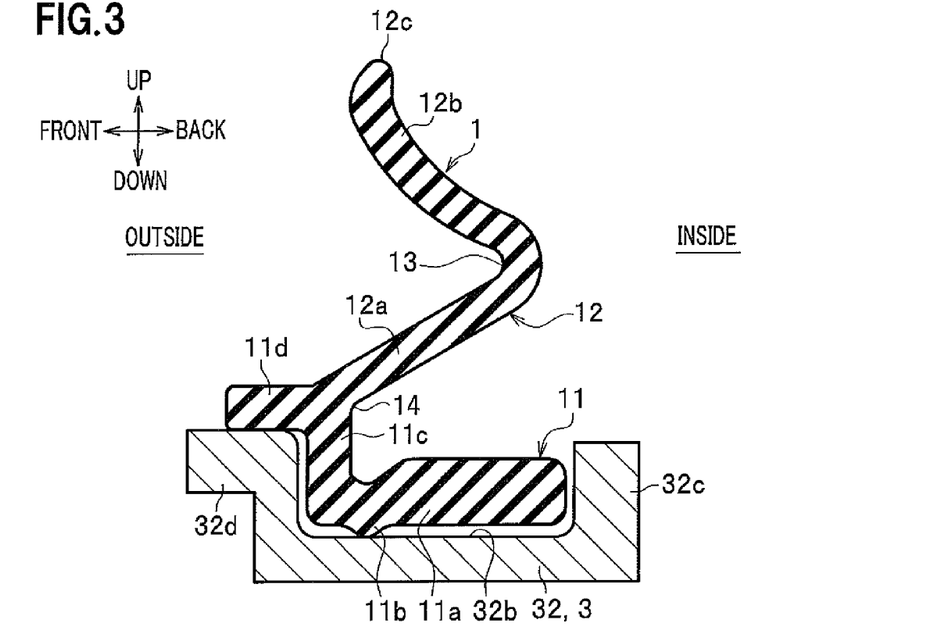
FIG. 3 is a cross-sectional view showing a state in which the packing is attached to a lower duct.

As shown in FIG. 3, the base part 11 is a portion that is housed in the housing groove 32b of the lower duct 32. The base part 11 is constituted by an extended portion 11a that is extended along the horizontal direction, a base part side seal portion 11b that extends downward from a portion near the outside of a bottom end of the extended portion 11a, a rising portion 11c that extends upward from an outside portion of a top end of the extended portion 11a, a stopper portion 11d that extends outside from an upside portion of an outside end portion of the rising portion 11c, and an engaging portion 11e (see FIG. 5) that extends downward from an inside end portion of the extended portion 11a.

The extended portion 11a is a portion that is extended along a direction intersecting with the sealing direction.

The base part side seal portion 11b is a portion that presses against a bottom face of the housing groove 32b, and has a curved surface shape. The base part side seal portion 11b is formed to have a curvature equal to or nearly equal to that of an extension end 12c of the seal lip part 12.

The rising portion 11c is a portion that is extended along the up-down direction.

The stopper portion 11d is a portion that is extended from a continuous portion between the base part 11 and the seal lip part 12 toward an opposite direction of the extended portion 11a. The stopper portion 11d abuts on and is engaged with a top face of an outer wall 32d that forms the housing groove 32b, to provide a function of preventing the packing 1 from collapsing to the outside. The stopper portion 11d also provides a function of stabilizing a position of the center of gravity of the base part 11. Note that the stopper portion 11d may be omitted.

Figure 5:
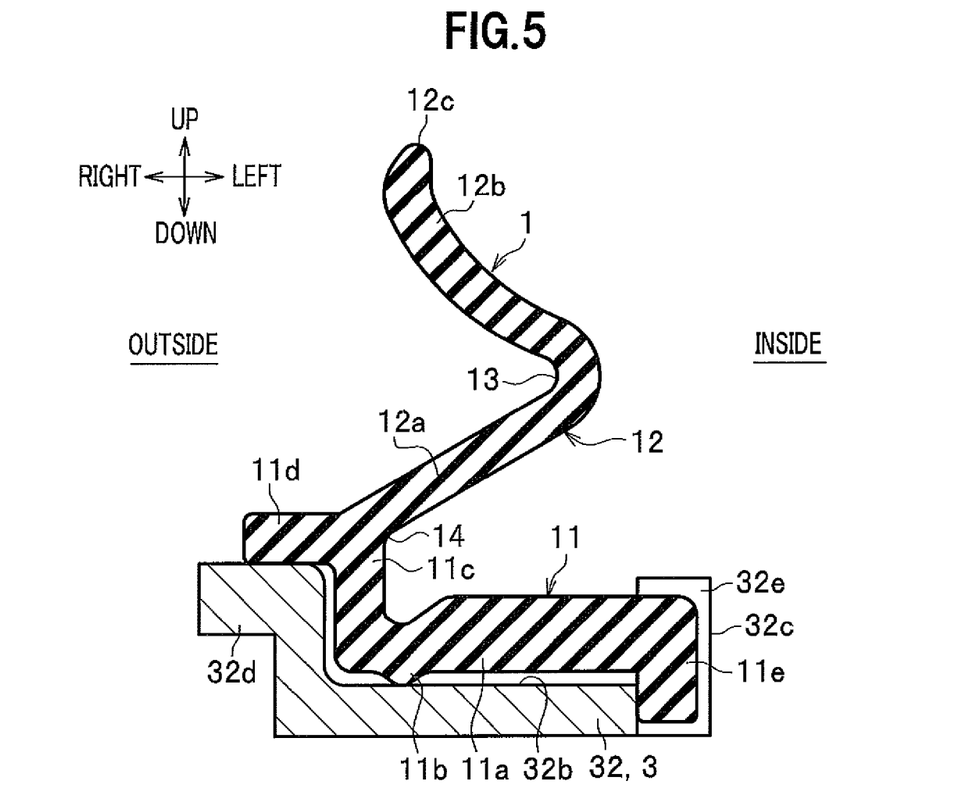
FIG. 5 is a cross-sectional view showing an engaging state of an engaging portion of the packing with an engaged portion of the lower duct.

As shown in FIG. 1 and FIG. 5, the engaging portion 11e is provided at a position which is aligned in the up-down direction with the engaged portion 32e of the lower duct 32. The engaging portion 11e is inserted into the engaged portion 32e to engage therewith.

Figure 4:
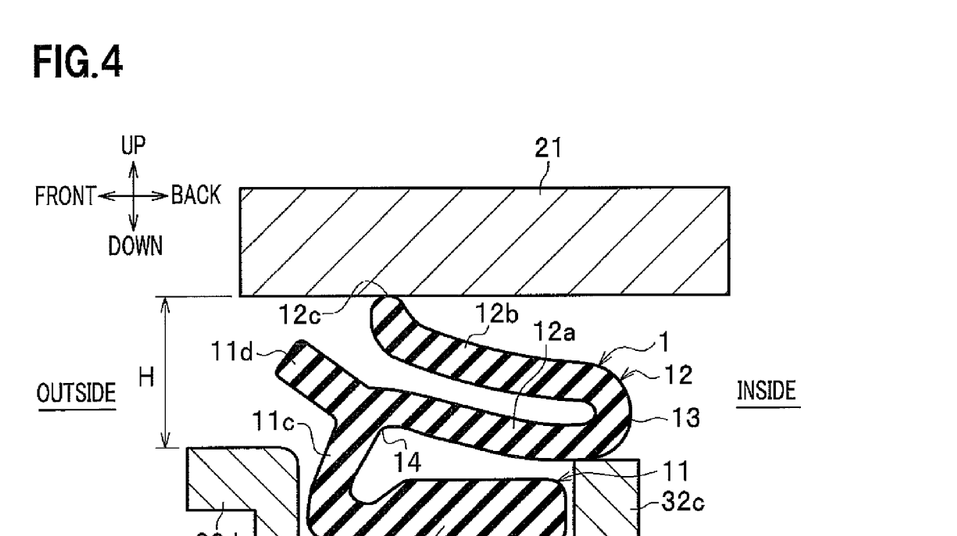
FIG. 4 is a cross-sectional view showing a state in which the battery module has been assembled together with the lower duct from the state shown in FIG. 3.

As shown in FIG. 3 and FIG. 4, the seal lip part 12 is a portion that extends from a top end of the rising portion 11c toward the battery module 21 to press against the battery module 21. As shown in FIG. 3, the seal lip part 12 is formed with a curve (turned edge) to have a middle portion thereof project toward the inside, in sectional view. Note that the packing 1 may have a shape in which the inside and the outside of the sectional shape shown in FIG. 3 are inverted.

The seal lip part 12 is constituted by a first extension portion 12a that is bent to extend upward and to the inside from the top end of the rising portion 11c, and a second extension portion 12b that is bent to extend upward and to the outside from a top end of the first extension portion 12a. A first bend portion 13 is formed in a continuous portion between the first extension portion 12a and the second extension portion 12b. A second bend portion 14 is formed in a continuous portion between the rising portion 11c and the first extension portion 12a. That is, the seal lip part 12 is allowed to bend at two points of the first bend portion 13 and the second bend portion 14.

The first extension portion 12a is a linear portion that extends at a slant from the top end of the rising portion 11c, in sectional view. The first extension portion 12a is slanted relative to the horizontal axis by a predetermined angle.

The second extension portion 12b is a nearly arc-like portion that extends at a slant from the top end of the first extension portion 12a, in sectional view. The second extension portion 12b is formed with a curve to have a middle portion thereof project toward the lower duct 32 side. The extension end 12c of the second extension portion 12b is a portion that presses against the battery module 21 for sealing, and has a curved surface shape. The extension end 12c and the base part side seal portion 11b are provided at positions which are aligned with each other in the sealing direction. The second extension portion 12b is slanted relative to the horizontal axis by a predetermined angle. Lengths of extension and angles of slant of the first extension portion 12a and the second extension portion 12b are set to be equal to or nearly equal to each other.

The first bend portion 13 is a portion that is formed by bending the midway portion (middle portion) of the seal lip part 12 to the outside. The second bend portion 14 is a portion that is formed by bending the continuous portion between the seal lip part 12 and the base part 11 to the inside. In other words, the first bend portion 13 and the second bend portion 14 are bent in opposite directions to each other.

The packing 1 according to the present embodiment is basically configured as described above, and operations and effects thereof will be described below.

As shown in FIG. 3 and FIG. 5, when assembling the battery module 21 and the lower duct 32 together, the base part 11 of the packing 1 is arranged in the housing groove 32b of the lower duct 32 and the engaging portion 11e of the packing 1 is inserted into the engaged portion 32e of the lower duct 32 for engagement. Then, as shown in FIG. 4, the battery module 21 is mounted via the packing 1 on the lower duct 32.

At this time, in the present embodiment, as shown in FIG. 3 and FIG. 4, since the first bend portion 13 is provided midway in the seal lip part 12, the second bend portion 14 is provided in the continuous portion between the base part 11 and the seal lip part 12, and the first bend portion 13 and the second bend portion 14 are bent in opposite directions to each other, the seal lip part 12 is bent at two points.

Figure 6:
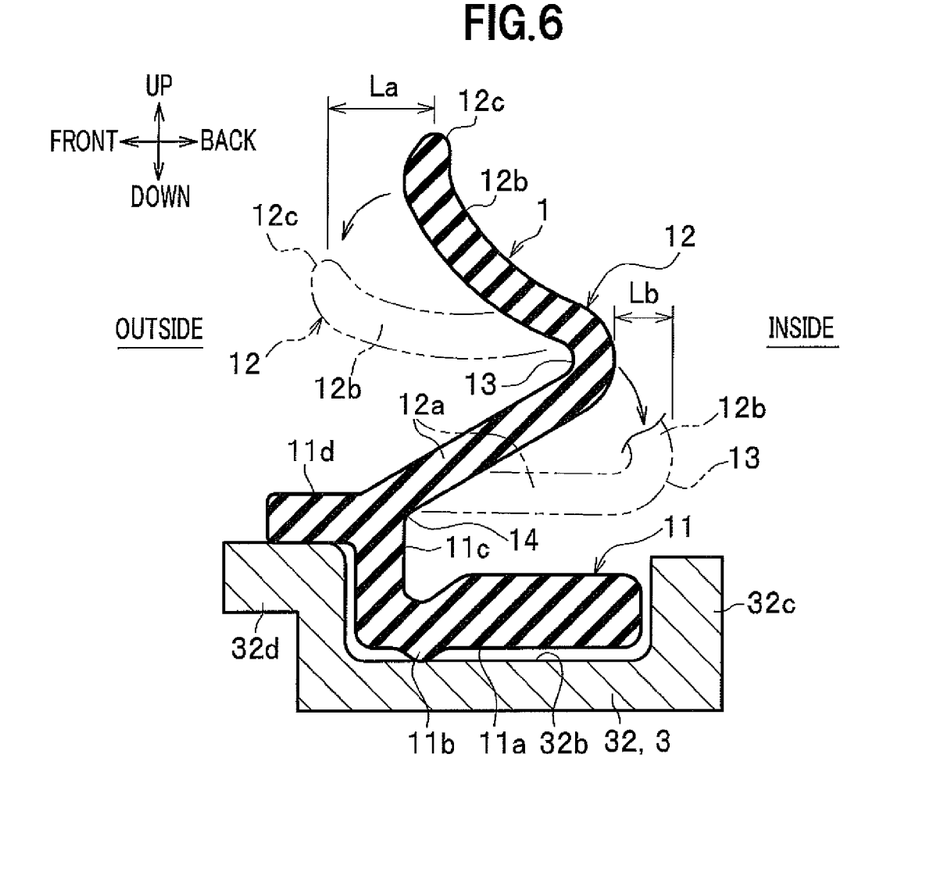
FIG. 6 is a cross-sectional view schematically showing a bending motion of the packing.

More specifically, as shown in FIG. 6, the second extension portion 12b of the seal lip part 12 is bent to fall over to the outside toward the lower duct 32 with the first bend portion 13 as the center, and the first extension portion 12a is bent to fall over to the inside toward the lower duct 32 with the second bend portion 14 as the center.

This allows a displacement of the extension end 12c to the outside by the bending action of the first bend portion 13 to be suppressed (counterbalanced) by the bending action of the second bend portion 14.

In other words, although the first bend portion 13 may be bent to displace the extension end 12c by a horizontal distance La to the outside (see a two-dot chain line in FIG. 6), in the present embodiment, the second bend portion 14 is bent to displace the second extension portion 12b by a horizontal distance Lb to the inside (see a two-dot chain line in FIG. 6), and since there is a relationship of La=Lb, a displacement of the extension end 12c to the outside can be suppressed.

Further in other words, since the second extension portion 12b is pulled to the inside by the horizontal distance Lb due to a bend deformation of the first extension portion 12a to the inside, a displacement of the extension end 12c by the horizontal distance La to the outside can be counterbalanced. Consequently, the positional displacement of the extension end 12c can be suppressed to provide a desired sealing performance.

Particularly, according to the present embodiment, even in a case where the sealing direction of the battery module 21 and the duct 3 and the fastening direction of the battery module 21 and the battery frame 22 are perpendicular to each other to make sealing performance unable to be secured using the fastening power, the packing 1 which can suppress the positional displacement of the extension end 12c can be used to sufficiently secure the desired sealing performance.

Moreover, according to the present embodiment, the seal lip part 12 can be bent at two points of the first bend portion 13 and the second bend portion 14, to realize a low reaction force easy to be deformed against a load and to become less influenced by a frictional force exerted by the battery module 21 on the other side. This allows the seal lip part 12 to be reliably bent to secure a good sealing performance even in a case where a set height H (see FIG. 4) of the battery module 21 relative to the lower duct 32 varies. That is, the present embodiment also has a technical significance on the point that it can cope with variability in the set height H.

Moreover, according to the present embodiment, since the base part 11 has the base part side seal portion 11b that presses against the duct 3, at the position which is aligned in the sealing direction with the extension end 12c of the seal lip part 12, it is possible to reliably seal the space between the base part 11 and the duct 3, and the space between the seal lip part 12 and the battery module 21, respectively.

Further, according to this configuration, surface pressures acting on the extension end 12c of the seal lip part 12 and the base part side seal portion 11b can be made uniform.

Moreover, according to the present embodiment, since the extension end 12c of the seal lip part 12 and the base part side seal portion 11b have the curved surface shape of the curvature equal to or nearly equal to each other, contact areas between the packing 1 and the duct 3 as well as the battery module 21 can be reduced, as compared to a case where the extension end 12c and the base part side seal portion 11b have a planar shape. Therefore, dispersion of the surface pressure can be suppressed to improve the sealing performance.

Moreover, according to the present embodiment, since the second extension portion 12b is formed with the curve to have the middle portion thereof project toward the duct 3 side, the extension end 12c of the seal lip part 12 can be brought into reliable contact with the battery module 21.

Further, according to this configuration, a contact area between the packing 1 and the battery module 21 can be reduced, as compared to a case where the second extension portion 12b has a linear shape. Therefore, dispersion of the surface pressure can be suppressed to improve the sealing performance.

Moreover, according to the present embodiment, since the base part 11 has the engaging portion 11e that is engageable with the engaged portion 32e of the duct 3, the packing 1 can be prevented from coming off from the duct 3 and the positioning of the packing 1 can be facilitated.

Moreover, according to the present embodiment, since the base part 11 has the extended portion 11a that is extended along the direction intersecting with the sealing direction, and the stopper portion 11d that is extended from the continuous portion between the base part 11 and the seal lip part 12 toward the opposite direction of the extended portion 11a, the position of the center of gravity of the base part 11 is stabilized and thus the packing 1 can be stably arranged on the duct 3.

Furthermore, since the stopper portion 11d abuts on the top face of the outer wall 32d that forms the housing groove 32b, so as to be engaged therewith, the packing 1 can be prevented from collapsing to the outside.

Although the embodiment of the present invention has been hereinbefore described in detail with reference to the drawings, the present invention is not limited to this embodiment and can be modified as appropriate within the scope not departing from the gist of the invention.

Figure 7A:
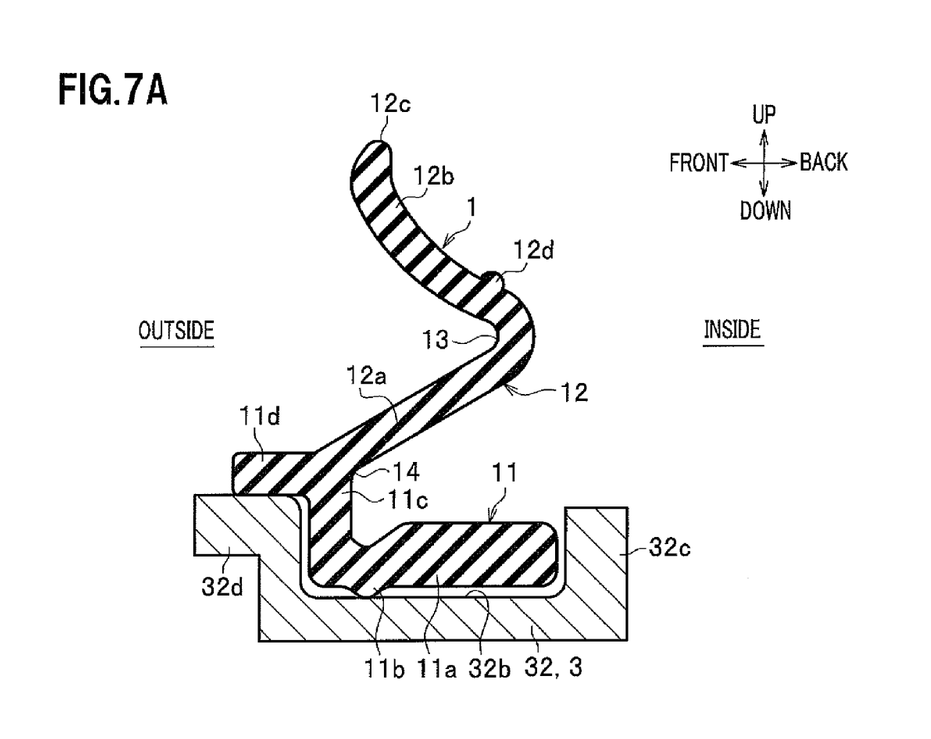
FIG. 7A is a cross-sectional view showing a state in which the packing is attached to the lower duct.
Figure 7B:
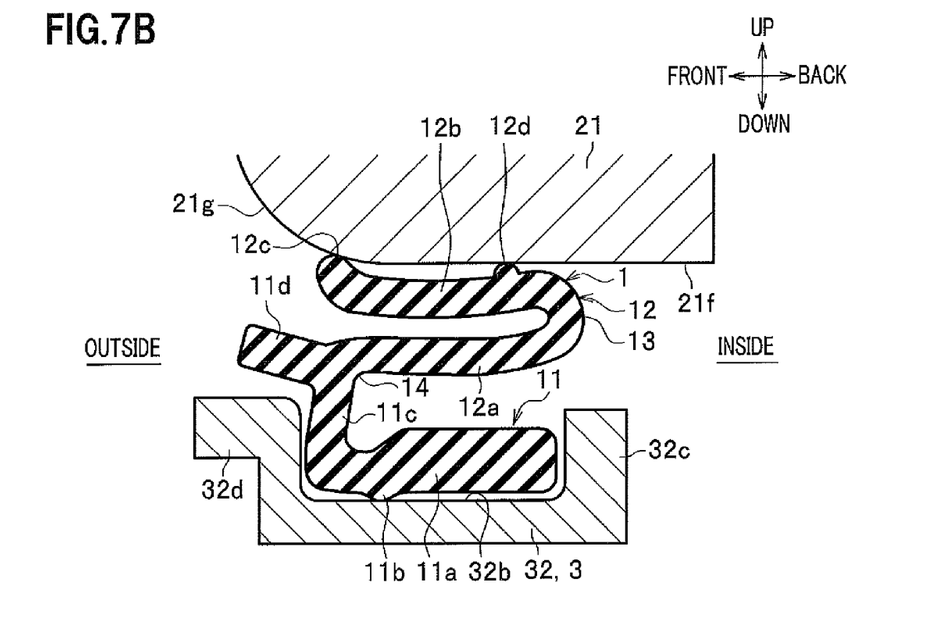
FIG. 7B is a cross-sectional view showing a state in which the battery module has been assembled together with the lower duct from the state shown in FIG. 7A.

For example, as shown in FIGS. 7A and 7B, the packing 1 may be configured to further include a lip side seal portion 12d. The lip side seal portion 12d is a portion that is provided between the first bend portion 13 and the extension end 12c to press against the battery module 21, and has a curved surface shape. The lip side seal portion 12d extends upward from a side face on the inside of the second extension portion 12b. The lip side seal portion 12d is provided at a position near the first bend portion 13. According to this configuration, the sealing can be performed at two locations of the extension end 12c and the lip side seal portion 12d, to improve the sealing performance between the packing 1 and the battery module 21. Incidentally, as shown in FIG. 7B, in the configuration in which the battery module 21 has a planar portion 21f and an R-corner portion 21g having an arc shape and the extension end 12c abuts on the R-corner portion 21g, the extension end 12c may sometimes slide along the R-corner portion 21g at the time of assembling. Even in such a case, according to the present modification, since the lip side seal portion 12d presses against the planar portion 21f, a backup sealing can be performed at the lip side seal portion 12d and thus the sealing performance can be reliably kept at the extension end 12c and the lip side seal portion 12d.

It is essential for the packing 1 of the present invention to provide the seal lip part 12 that is bent at least two points, but as long as this condition is satisfied, the sectional shape of the base part 11 may be modified as appropriate.

Figure 8:
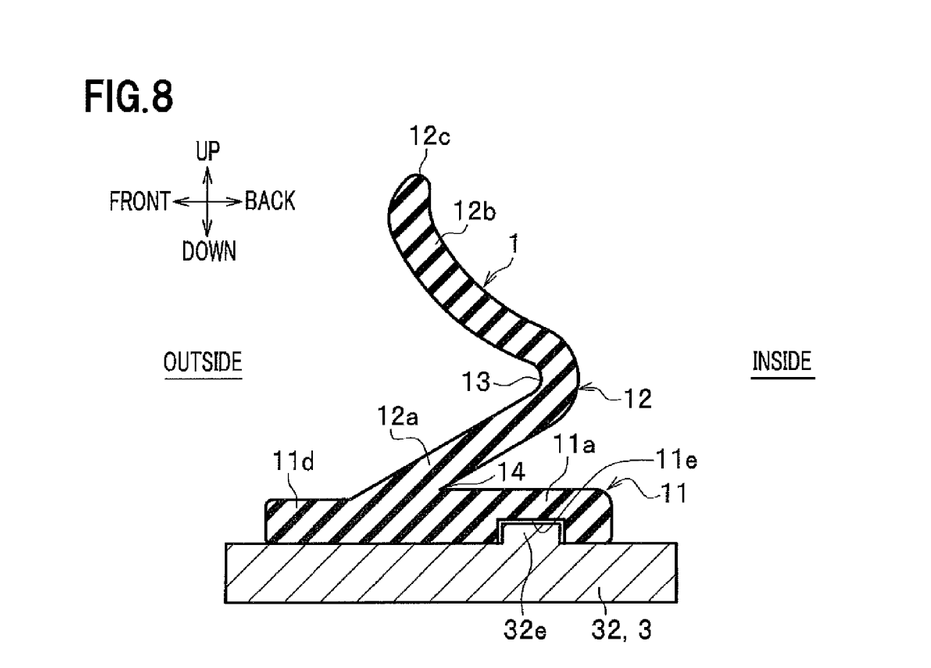
FIG. 8 is a cross-sectional view showing a packing according to a second modification of the embodiment.

For example, a sectional shape such as shown in FIG. 8 may be adopted. The present modification will be described, taking for example a case where the base part 11 of the packing 1 is attached to the lower duct 32. The base part 11 of the packing 1 according to the present modification is constituted by an extended portion 11a that is extended along the horizontal direction, a stopper portion 11d that extends to the outside from an outside end portion of the extended portion 11a, and an engaging portion 11e that is recessed on a portion near the inside of a bottom end of the extended portion 11a. The extended portion 11a abuts on a top face of the lower duct 32. The seal lip part 12 is formed to continue from an outside portion of a top end of the extended portion 11a. The stopper portion 11d is extended from the continuous portion between the base part 11 and the seal lip part 12 toward the opposite direction of the extended portion 11a. The stopper portion 11d abuts on the top face of the lower duct 32 to be engaged therewith. Inserted into the engaging portion 11e is an engaged portion 32e that is protruded from the top face of the lower duct 32.

Figure 9:
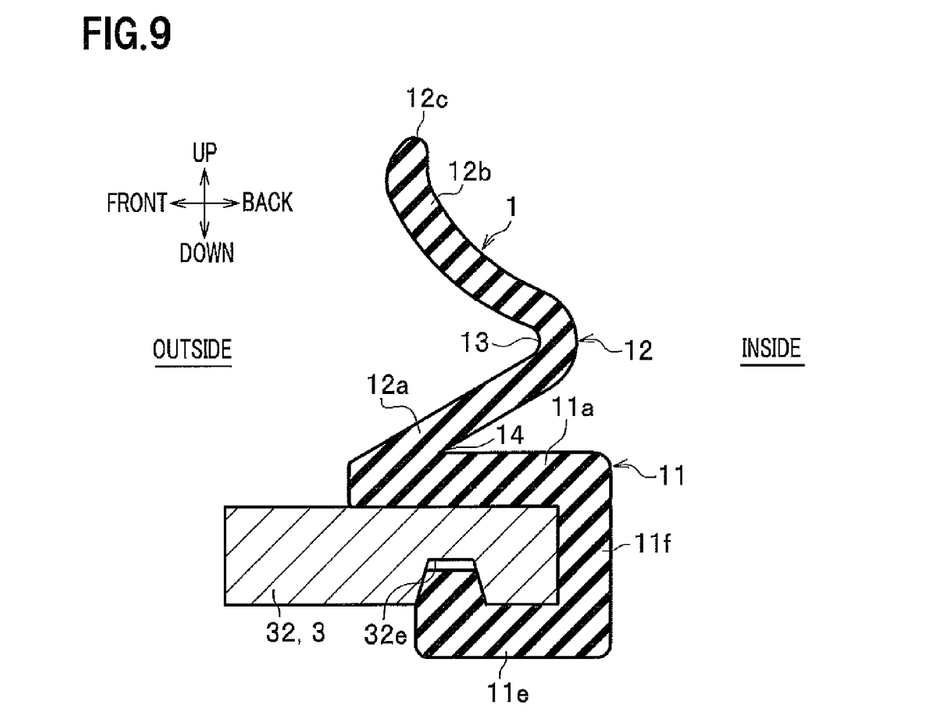
FIG. 9 is a cross-sectional view showing a packing according to a third modification of the embodiment.

Moreover, for example, a sectional shape such as shown in FIG. 9 may be adopted. The base part 11 of the packing 1 according to the present modification is attached to the lower duct 32 to sandwich an inside fringe portion thereof from up-down sides thereof. The base part 11 is constituted by an extended portion 11a that is extended along the horizontal direction, a vertical wall portion 11f that is vertically provided downward from an inside end portion of the extended portion 11a, and a nearly L-shaped engaging portion 11e that extends to the outside from a bottom end of the vertical wall portion 11f. The extended portion 11a abuts on a top face of the lower duct 32. The seal lip part 12 is formed to continue from an outside portion of a top end of the extended portion 11a. The vertical wall portion 11f abuts on an inside side face of the lower duct 32. A projection at the tip of the engaging portion 11e is inserted into an engaged portion 32e that is recessed on a bottom face of the lower duct 32, so as to be engaged therewith.

Although in the above embodiment the description has been given of the case where the packing 1 of the present invention is arranged between the battery module 21 and the duct 3, the present invention is not limited to this embodiment and can be applied to any place at which prevention of leakage of fluid such as air or water is required.

Figure 10A:
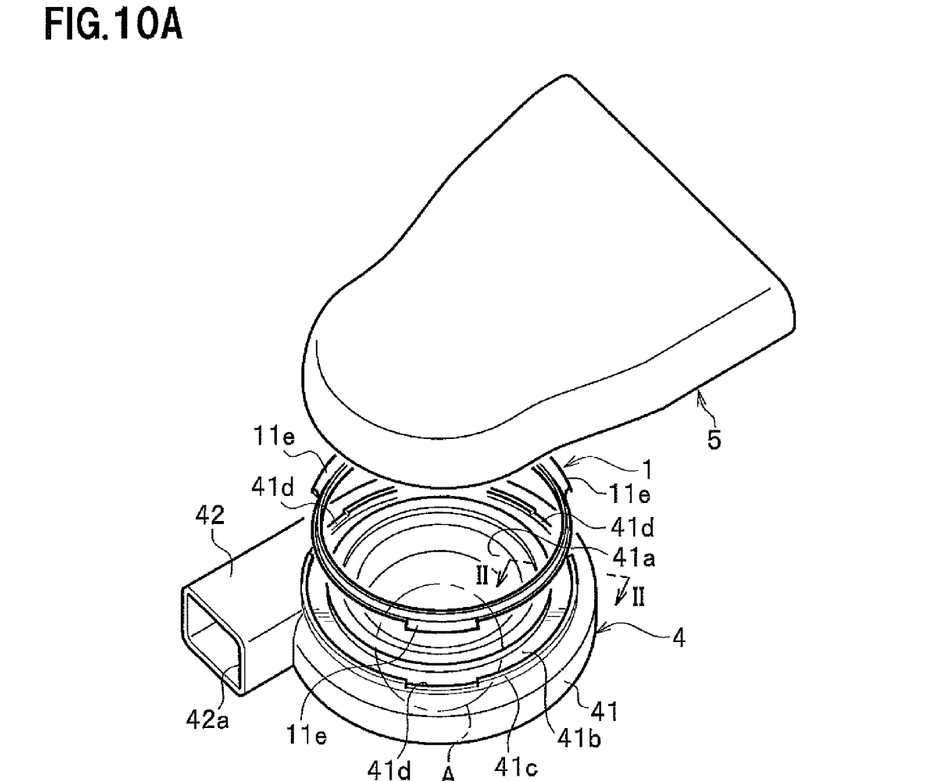
FIG. 10A is an exploded perspective view showing a seal structure of a fan and a duct to which a packing according to a fourth modification of the embodiment is applied.
Figure 10B:
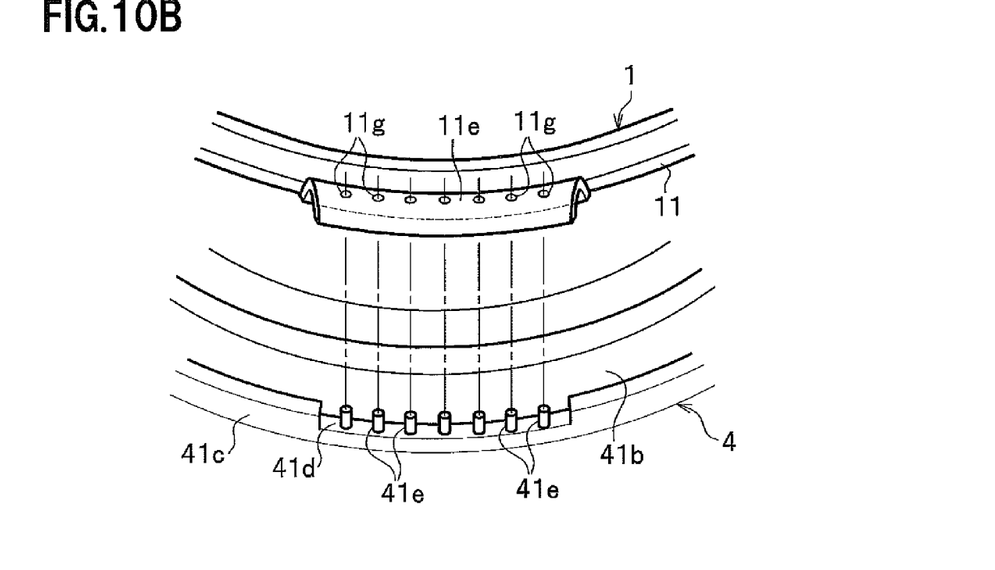
FIG. 10B is an enlarged view of the part A in FIG. 10A.
Figure 11:
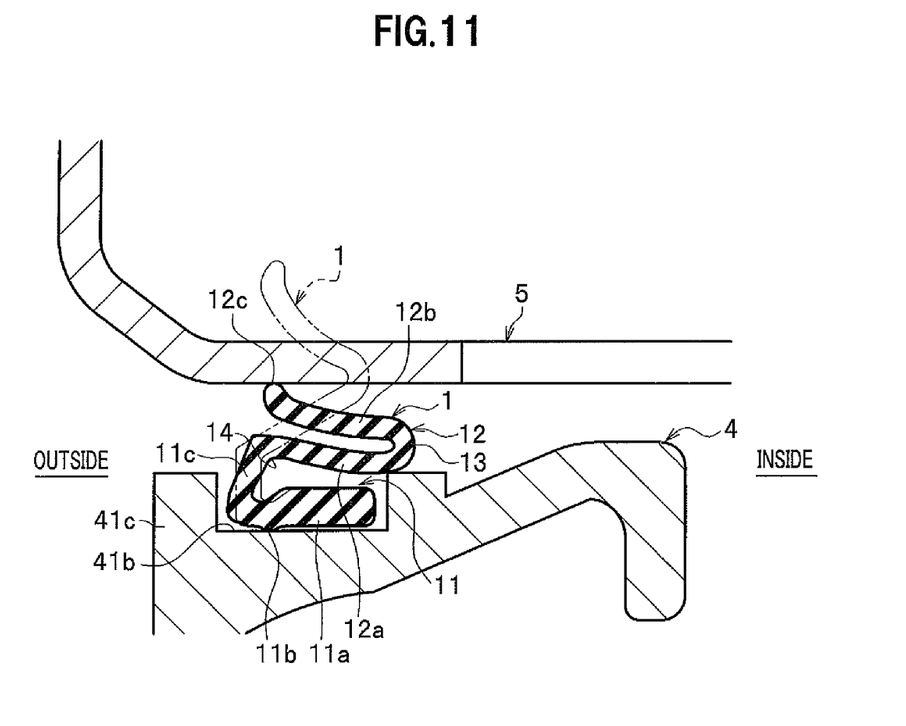
FIG. 11 is a cross-sectional view taken along the line II-II in FIG. 10A, showing a state in which the packing, the fan and the duct are assembled together.

For example, as shown in FIGS. 10A, 10B and 11, the packing 1 may be arranged between a fan 4 and a duct 5.

Note that in the description below, points which differ from the above embodiment will be described in detail, and the same element or part as that in the embodiment is given the same reference sign and a duplicate description is omitted.

In the drawings to be referred to, FIG. 10A is an exploded perspective view showing a seal structure of the fan 4 and the duct 5 to which the packing 1 according to a fourth modification of the embodiment is applied, and FIG. 10B is an enlarged view of the part A in FIG. 10A. FIG. 11 is a cross-sectional view taken along the line II-II in FIG. 10A, showing a state in which the packing 1, the fan 4 and the duct 5 are assembled together. Note that a two-dot chain line in FIG. 11 shows a state of the packing 1 before assembling the duct 5 together with the packing 1.

<Fan>

As shown in FIG. 10A, the fan 4 is provided with a nearly cylindrical fan main body 41 that is opened toward the duct 5, and a discharge part 42 that projects to the outside in the radial direction from a part of the outer periphery of the fan main body 41. Formed at an end portion of the fan main body 41 on the side of the duct 5 is an introduction port 41a of a circular shape in planar view, for introducing a cooling gas into the fan main body 41. Formed on the outer circumference side of the introduction port 41a is a housing groove 41b of a circular annular shape in planar view. Three engaged portions 41d are provided on an outer circumference wall 41c that forms the housing groove 41b, at equal angles along the circumferential direction. The engaged portion 41d is formed by cutting off a portion of the outer circumference wall 41c by a predetermined length toward a direction away from the duct 5 and constitutes a step portion which is positioned lower than the remaining portion of the outer circumference wall 41c. As shown in FIG. 10B, the engaged portion 41d has a plurality of projections 41e arranged along the circumferential direction. As shown in FIG. 10A, formed at the tip of the discharge part 42 is a rectangular discharge port 42a for discharging the cooling gas. The fan 4 in the present modification constitutes "one member" in the appended claims.

<Duct>

As shown in FIG. 10A, the duct 5 is a duct for supplying a cooling gas to the introduction port 41a of the fan 4. The duct 5 is a nearly plate-like member and is provided so as to cover the introduction port 41a of the fan 4. The duct 5 in the present modification constitutes "the other member" in the appended claims.

<Packing>

The packing 1 is a member of a circular annular shape in planar view that seals a space between the introduction port 41a of the fan 4 and the duct 5. Note that the shape of the packing 1 in planar view maybe modified as appropriate according to a shape of the target to be sealed. As shown in FIG. 11, the base part 11 is housed in the housing groove 41b of the fan 4. The seal lip part 12 extends from the top end of the rising portion 11c toward the duct 5 to press against the duct 5. As shown in FIG. 10A, the engaging portion 11e is provided at a position which is aligned in the up-down direction with the engaged portion 41d of the fan 4. As shown in FIG. 10B, the engaging portion 11e is a portion that is formed to project outward in a radial direction from the outer circumference face of the base part 11, and has a nearly C-shaped form in cross-sectional view which is open to the side of the fan 4. The engaging portion 11e has a plurality of hole portions 11g penetrating therethrough in the up-down direction. In the present modification, the engaging portion 11e is placed onto the engaged portion 41d and the projections 41e are inserted into the hole portions 11g, so as to attach the packing 1 to the fan 4.

DESCRIPTION OF REFERENCE SIGNS

1: Packing, 11: Base part, 11a: Extended portion, 11b: Base part side seal portion, 11d: Stopper portion, 11e: Engaging portion, 12: Seal lip part, 12a: First extension portion, 12b: Second extension portion, 12c: Extension end portion, 12d: Lip side seal portion, 13: First bend portion, 14: Second bend portion, 2: Battery pack, 21: Battery module (Other member), 21d: Gap, 22: Battery frame, 3: Duct (One member), 31: Upper duct, 31b: Housing groove, 32: Lower duct, 32b: Housing groove, 32e: Engaged portion, 4: Fan (One member), 41b: Housing groove, 41d: Engaged portion, 5: Duct (Other member)

What is claimed is:

1. A packing that seals a space between two members, comprising:
   a base part that is attached to one member of the two members; and
   a seal lip part that extends from the base part toward the other member of the two members and allows an extension end thereof to press against the other member, wherein
   a first bend portion is provided midway in the seal lip part,
   a second bend portion is provided in a continuous portion between the base part and the seal lip part, and is out of contact with the other member in a bent state of the seal lip part, and
   the first bend portion and the second bend portion are bent in opposite directions to each other, and
   wherein a portion extending from the first bend portion to the extension end, and a portion extending from the first bend portion to the continuous portion, are configured to be deformable only toward the one member, respectively.

2. The packing according to claim 1, wherein the base part has a base part side seal portion that presses against the one member, at a position which is aligned in a sealing direction with the extension end of the seal lip part.

3. The packing according to claim 2, wherein the extension end of the seal lip part has a curved surface shape, and the base part side seal portion is formed to have a curvature equal to or nearly equal to a curvature of the extension end of the seal lip part.

4. The packing according to claim 1, wherein the portion extending from the first bend portion to the extension end of the seal lip part is formed with a curve to have a middle portion thereof project toward the one member side.

5. The packing according to claim 1, wherein the seal lip part has a lip side seal portion that is provided between the first bend portion and the extension end of the seal lip part to press against the other member.

6. The packing according to claim 1, wherein the base part has an engaging portion that is engageable with an engaged portion provided on the one member.

7. The packing according to claim 1, wherein the base part has an extended portion that is extended along a direction intersecting with a sealing direction, and a stopper portion that is extended from the continuous portion toward an opposite direction of the extended portion.

8. A seal structure of a battery module, comprising:
   a battery module having an opening on at least one of an upside face and a downside face thereof;

a duct that is attached to at least one of the upside face and the downside face of the battery module and supplies fluid through the opening;

a packing that seals a space between the battery module and the duct; and a battery frame that is fastened and fixed to an orthogonal face of the battery module, which is perpendicular to the upside face and the downside face, wherein the packing includes:

a base part that is attached to one of the battery module and the duct; and a seal lip part that extends from the base part toward the other of the battery module and the duct and allows an extension end thereof to press against the other of the battery module and the duct, wherein a first bend portion is provided midway in the seal lip part, a second bend portion is provided in a continuous portion between the base part and the seal lip part, and is out of contact with the other of the battery module and the duct in a bent state of the seal lip part, and the first bend portion and the second bend portion are bent in opposite directions to each other, and wherein a portion extending from the first bend portion to the extension end, and a portion extending from the first bend portion to the continuous portion, are configured to be deformable only toward the one member, respectively;

the base part has a base part side seal portion that presses against the one member, at a position which is aligned in a sealing direction with the extension end of the seal lip part; and the extension end of the seal lip part has a curved surface shape, and the base part side seal portion is formed to have a curvature equal to or nearly equal to a curvature of the extension end of the seal lip part, and wherein a sealing direction of the battery module and the duct and a fastening direction of the battery module and the battery frame are perpendicular to each other.

* * * * *